United States Patent
Bauer et al.

(10) Patent No.: US 7,844,387 B2
(45) Date of Patent: Nov. 30, 2010

(54) METHOD AND DEVICE FOR OPTIMIZING THE CONSUMPTION IN A MOTOR VEHICLE

(75) Inventors: Uwe Bauer, Schwieberdingen (DE); Thomas Winter, Freiberg Am Neckar (DE); Eveline-Johanna Fackelmann, Hemmingen (DE); Winfried Ziegler, Maulbronn (DE)

(73) Assignee: Robert Bosch GmbH, Stuttgart (DE)

( * ) Notice: Subject to any disclaimer, the term of this patent is extended or adjusted under 35 U.S.C. 154(b) by 391 days.

(21) Appl. No.: 12/009,546

(22) Filed: Jan. 17, 2008

(65) Prior Publication Data

US 2008/0245338 A1 Oct. 9, 2008

(30) Foreign Application Priority Data

Feb. 28, 2007 (DE) .................. 10 2007 009 690

(51) Int. Cl.
*B60T 7/12* (2006.01)
*F02M 35/10* (2006.01)

(52) U.S. Cl. .................. 701/103; 701/114; 701/115; 123/184.56

(58) Field of Classification Search .................. 701/103, 701/104, 110, 114, 115; 123/184.56, 478, 123/480

See application file for complete search history.

(56) References Cited

U.S. PATENT DOCUMENTS

| 5,992,142 A * | 11/1999 | Pott ............................. 60/274 |
| 6,279,530 B1 * | 8/2001 | Becker ...................... 123/306 |
| 6,292,741 B1 * | 9/2001 | Bitzer et al. ................ 701/115 |
| 7,203,589 B2 * | 4/2007 | Baldauf et al. .............. 701/103 |
| 7,341,035 B2 * | 3/2008 | Kassner et al. ........... 123/179.3 |
| 2006/0282210 A1 * | 12/2006 | Baldauf et al. .............. 701/103 |

\* cited by examiner

*Primary Examiner*—John T Kwon
(74) *Attorney, Agent, or Firm*—Kenyon & Kenyon LLP

(57) ABSTRACT

A method for consumption-optimized operation of an internal combustion engine of a motor vehicle is described, an engine output of the internal combustion engine being set as a function of a position of a gas pedal according to a manipulated variable, the gas pedal being adjustable in a first mechanically defined adjustment range between an initial position and a specific gas pedal position, the internal combustion engine being controlled with a consumption-optimized engine output with regard to the instantaneous engine speed by adjusting the gas pedal to the specific gas pedal position, the consumption-optimized engine output causing a minimal fuel consumption at the instantaneous engine speed.

14 Claims, 2 Drawing Sheets

METHOD AND DEVICE FOR OPTIMIZING THE CONSUMPTION IN A MOTOR VEHICLE

CROSS REFERENCE

This application claims the benefit under 35 U.S.C. §119 of German Patent Application No. 102007009690.0 filed on Feb. 28, 2007, the entirety of which is expressly incorporated herein by reference in its entirety.

FIELD OF THE INVENTION

The present invention relates to a method and a device for optimizing the consumption of an internal combustion engine for a motor vehicle.

BACKGROUND INFORMATION

In a motor vehicle, the driver specifies a driver-intended torque or a driver-intended engine output of a vehicle with which the vehicle is to be driven by operating the gas pedal, i.e., via the gas pedal position. In a motor vehicle having an internal combustion engine, the gas pedal position corresponds to a position of a mechanical throttle valve which controls the air supply to the engine. The connection between the gas pedal and the throttle valve may be designed to be mechanical as well as electrical. In the latter case, the gas pedal position is assigned a throttle valve position in the form of a provided manipulated variable via an assignment characteristic curve. Gas pedal values are assigned to the gas pedal position, a maximum gas pedal value corresponding either to the absolutely maximum possible torque or to the instantaneously maximum possible torque, which means that the driver operates the gas pedal "by feeling" for engine outputs which are lower than the maximum possible engine output, and the gas pedal is displaced to the maximum for triggering the maximum possible engine output.

However, it is not possible for the driver to operate the gas pedal in such a way that the motor vehicle is operated in a consumption-optimized manner since the consumption-optimized maximum engine output is typically lower than the maximum possible engine output by an amount not determinable by the driver and a corresponding assignment to a gas pedal position is therefore not determinable offhand by a driver of the motor vehicle.

SUMMARY

An object of the present invention is to provide a method and a device for a motor vehicle which allows the driver to operate the vehicle in a consumption-optimized manner.

According to a first aspect of the present invention, a method for consumption-optimized operation of an internal combustion engine of a motor vehicle is provided. An engine output of the internal combustion engine is set as a function of a position of a gas pedal according to a manipulated variable, the gas pedal being adjustable in a first mechanically defined adjustment range between an initial position and a specific gas pedal position. By adjusting the gas pedal to the specific gas pedal position, the internal combustion engine is controlled with a consumption-optimized engine output with regard to the instantaneous engine speed, the consumption-optimized engine output causing minimal fuel consumption at the instantaneous engine speed.

Moreover, gas pedal positions within the first adjustment range may be assigned to respective manipulated variables according to an assignment function, the respective manipulated variables controlling the internal combustion engine with corresponding engine outputs which are between a possible minimum engine output and the consumption-optimized engine output at the instantaneous engine speed.

In the first adjustment range, the gas pedal positions may be assigned to manipulated variables according to a steady assignment function.

An injected fuel quantity or an opening of a throttle valve is set preferably with the aid of the manipulated variable.

According to one specific embodiment, the specific gas pedal position corresponds to a stop of the gas pedal in a maximally displaced position.

A second adjustment range of the gas pedal is provided subsequent to the specific gas pedal position of the first adjustment range; displacing the gas pedal from the first into the second adjustment range requires an increased displacement force compared to a displacement force required for a displacement in the first adjustment range. Gas pedal positions within the second adjustment range are each assigned to additional manipulated variables for setting the engine output according to an additional assignment function. The respective additional manipulated variables control the internal combustion engine, according to the additional assignment function, with corresponding engine outputs which are between the consumption-optimized engine output and a maximum possible engine output at the instantaneous engine speed.

According to one specific embodiment, in a normal operating mode, different from the consumption-optimized operating mode, the internal combustion engine is controlled at the specific gas pedal position with a maximum possible engine output with regard to the instantaneous engine speed.

The normal operating mode or the consumption-reduced operating mode may be selected as a function of a manual input.

According to another aspect, a device is provided for controlling an internal combustion engine of a motor vehicle with an engine output assignable via a manipulated variable. The device includes a gas pedal in order to set an engine output of the internal combustion engine according to the manipulated variable as a function of a position of the gas pedal, the gas pedal being adjustable in a first mechanically defined adjustment range between an initial position and a specific gas pedal position, and a control unit for controlling the internal combustion engine with a consumption-optimized engine output regarding the instantaneous engine speed by adjusting the gas pedal to the specific gas pedal position of the first adjustment range, the consumption-optimized engine output causing minimal fuel consumption at the instantaneous engine speed.

Moreover, the gas pedal may be provided with a second mechanically defined adjustment range which follows the first adjustment range; displacement of the gas pedal from the first into the second adjustment range requires an increased displacement force compared to a displacement force required for a displacement in the first adjustment range. The control unit is designed to assign gas pedal positions to respective additional manipulated variables within the second adjustment range for setting the engine output according to an additional assignment function, the respective additional manipulated variables controlling the internal combustion engine with corresponding engine outputs which are between the consumption-optimized engine output and a maximum possible engine output at the instantaneous engine speed.

BRIEF DESCRIPTION OF THE DRAWINGS

Preferred specific embodiments of the present invention are explained in greater detail below based on the figures.

DETAILED DESCRIPTION OF EXAMPLE EMBODIMENTS

Figure 1:
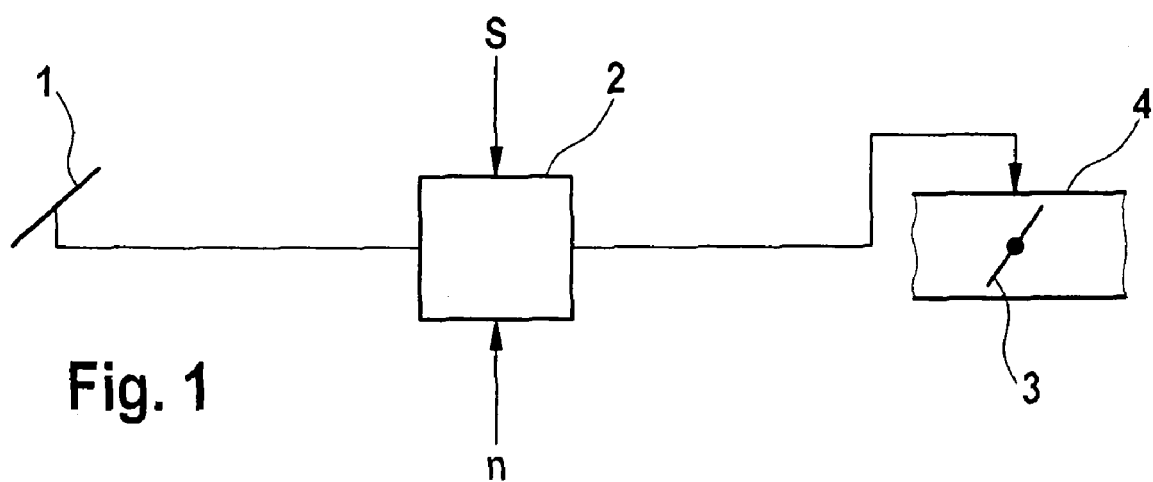
FIG. 1 shows a representation of a device for controlling an internal combustion engine as a function of a gas pedal position according to a specific example embodiment of the present invention.

FIG. 1 schematically shows a gas pedal control for a gasoline engine. It includes a gas pedal 1 which is connected to a control unit 2 which controls the position of a throttle valve 3 in an air supply section 4 of an internal combustion engine according to a manipulated variable. Air supply section 4 conducts air to an air intake (not shown) of the internal combustion engine via which an air/fuel mixture is conducted into a combustion chamber. Gas pedal 1 may be connected to control unit 2 either mechanically, e.g., via rods, or electrically. The specific embodiment described herein relates to the latter case. Gas pedal 1 is provided with an actuator, e.g., a potentiometer, in order to furnish an electrical resistance as a function of the gas pedal position which is tapped by control unit 2 and to detect the gas pedal position therefrom. As an alternative, the gas pedal position may also be provided with the aid of other electrical variables of control unit 2, e.g., as capacitance, inductance, frequency of an electrical signal, and the like. For example, corresponding to a proportionate displacement of gas pedal 1 between an initial position (inactive position of the gas pedal) up to a maximal displaced position (first gas pedal position), the gas pedal position is assigned to a corresponding gas pedal value. This may take place, for example, by directly assigning the gas pedal value to the percentage of displacement; the gas pedal value may assume a value between 0% and 100%, for example.

From the provided gas pedal value, control unit 2 ascertains a manipulated variable, using which the position of throttle valve 3 is determined. It was previously common practice to map the gas pedal value to the manipulated variable, i.e., the throttle valve position, generally according to a linear or at least continuous function so that at a maximal displaced position of gas pedal 1 the throttle valve opens air supply section 4 completely in order to trigger the maximum possible engine output. However, a complete opening of the throttle valve to achieve a maximum engine output, i.e., a maximum torque, does not correspond to a consumption-optimized operation of the internal combustion engine in which there is the least specific fuel consumption at a specific engine speed n.

Figure 2:
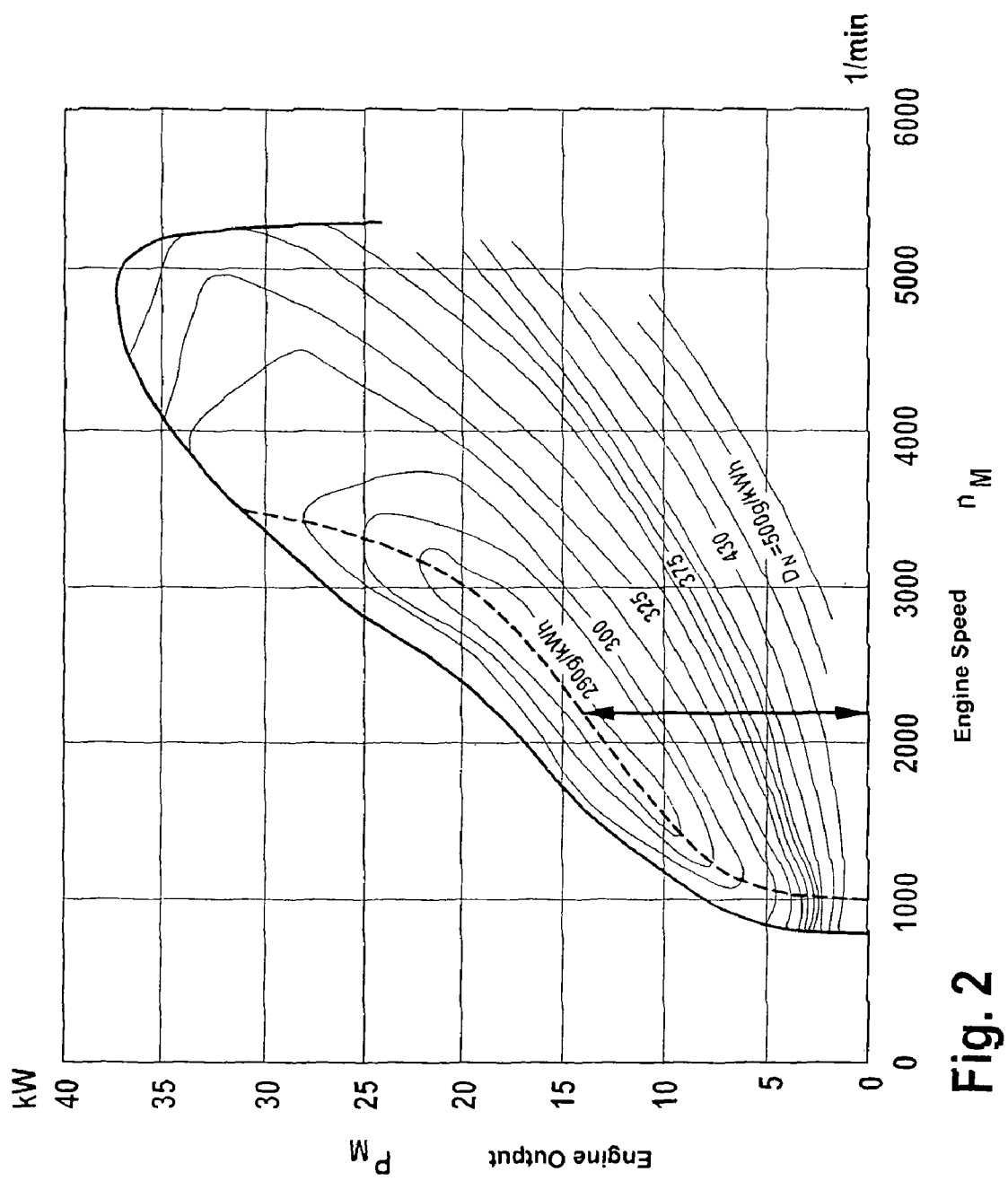
FIG. 2 shows a diagram for illustrating the consumption-optimized operation of an internal combustion engine as a function of the engine speed and the output.

FIG. 2 shows a diagram which indicates the maximum engine output at specific engine speeds n based on the bold upper characteristic curve. Moreover, values for the fuel consumption at lower engine outputs than the maximum engine output at specific engine speed n may be inferred from the diagram. The amount of the fuel consumption is indicated in the diagram in the form of contour lines as the weight of the carbon dioxide ($CO_2$) discharged per kilowatt hour. It is apparent that in an engine speed range of approximately 1,000 rpm to 3,000 rpm the optimum, which is indicated by a dashed line, is about 20% below the maximum engine output. This means that there is consumption-optimized operation at a specific engine speed at a correspondingly reduced engine output. It is not possible for the driver to achieve consumption-optimized operation via a corresponding gas pedal position since he has no information about when the optimum gas pedal position for the consumption-optimized range is achieved.

According to a first specific embodiment of the present invention, an ascertainment unit for ascertaining the manipulated variable is implemented in control unit 2 in which, for example, a map (generally an assignment function), which is produced in a lookup table or with a corresponding conversion formula or the like, is implemented whereby a manipulated variable is ascertained from the gas pedal value, which represents the gas pedal position of gas pedal 1, as a function of information provided about instantaneous engine speed n, the manipulated variable representing the position of the throttle valve whose maximum opened position corresponds to the optimum of consumption reduction indicated by the dashed line. In other words, the driver does not achieve the maximum possible torque of the engine when completely pressing gas pedal 1, i.e., bringing the gas pedal into the maximally displaced position, but in contrast achieves a reduced torque which corresponds to the engine output with the least specific fuel consumption.

Such a consumption-reduced operating mode of the engine may be displayed automatically, for example, by an engine controller (not shown) via an operating mode signal S. Such automatic generation of operating mode signal S may be carried out, for example, when there is an indication that the fuel tank content has fallen below a tank content threshold value.

Alternatively or additionally, operating mode signal S may be preset by the driver, by operating a switch, for example. As a function of operating mode signal S, either the gas pedal value, which corresponds to the gas pedal position, is converted into a corresponding manipulated variable for the throttle valve position according to the map for consumption optimization present in control unit 2 or, in a normal operating mode, the gas pedal value is converted, as usual, into the manipulated variable for controlling the internal combustion engine with a corresponding engine output generally according to a linear or at least continuous function, or the gas pedal value is used directly for the throttle valve position in such a way that the maximum displacement of the gas pedal corresponds to a throttle valve position for the maximum possible engine output. Operating mode signal S may also be preset via a switch position of a manually operable switch, using which the vehicle driver may select a consumption-optimized operation or an operation with maximum engine output. The switch may be situated on the dashboard.

As an alternative, the switch may be situated at the end position (maximum displacement) of the gas pedal so that the driver may switch between the consumption-optimized operating mode and a normal operating mode when the gas pedal is completely displaced.

The throttle valve position is set based on the manipulated variable which is determined for each engine speed, which is conveyed to control unit 2, based on the map shown in the graphic diagram in FIG. 2. At an engine speed of 2,200 rpm, the entire range of gas pedal values is assigned in the map to the range of the engine output possible during consumption-optimized operation between 0 kW and 14 kW (up to the dashed line), so that the maximum possible gas pedal displacement corresponds to an engine output of 14 kW and a corresponding manipulated variable for the throttle valve position is assigned to this value. In non-consumption-optimized operation, the entire range of gas pedal values is assigned to the range of the engine output possible in normal operation between 0 kW and 18 kW (up to the bold line).

A second specific embodiment of the present invention provides that gas pedal 1 has a mechanical resistance between the initial position and the maximum possible displaced position, in a first adjustment range of gas pedal 1 the mechanical resistance allowing normal operation of the gas pedal by the driver up to a specific pedal position which represents a gas pedal threshold value of 80%, for example, and increased force being necessary at this gas pedal threshold value to move the gas pedal beyond the gas pedal threshold value into a second adjustment range completely in the direction of the maximally displaced position. This may be implemented in such a way that at the gas pedal threshold value merely a threshold having an increased resistance must be overcome, gas pedal 1 being able to be moved, after having overcome the threshold, with the same resistance than in the range prior to the specific gas pedal position.

Alternatively, the mechanical resistance may be increased from the gas pedal position, which corresponds to the gas pedal threshold value, up to the maximally displaced position of gas pedal 1, so that the driver notices by the increased counterpressure during further displacement of gas pedal 1 that he is operating the vehicle in a non-consumption-optimized mode. The mechanical resistance, which determines the counterpressure of the gas pedal, may be variable in the range from the gas pedal position, which corresponds to the gas pedal threshold value, up to the maximally displaced position of gas pedal 1. In particular, the mechanical resistance may be designed to be rising with increasing displacement of the gas pedal.

In this specific embodiment, control unit 2 is designed to assign gas pedal values to a throttle valve between the initial position and the gas pedal threshold value according to the map for the consumption-optimized setting so that, at the specific gas pedal position which corresponds to the gas pedal threshold value, a manipulated variable for controlling the internal combustion engine (the throttle valve) is obtained which corresponds to the least specific fuel consumption at specific engine speed n. Due to the resistance at the gas pedal threshold value, the driver notices while operating gas pedal 1 when the maximum engine output which may be triggered in consumption-optimized operation is reached.

If the driver wants to leave the consumption-optimized operation and trigger higher engine output, the driver may overcome the resistance of the specific gas pedal position by increased pressure on the gas pedal, thereby triggering a higher engine output. However, the driver knows that he has left the consumption-optimized operation due to the increased resistance of gas pedal 1. By retracting gas pedal 1, the driver may return to consumption-optimized operation with no problem.

In the second specific embodiment, gas pedal values of the initial position and of the specific gas pedal position are assigned to the engine outputs from 0 to the maximum engine output in consumption-optimized operation, i.e., the engine output having the least specific fuel consumption. Gas pedal positions between the specific gas pedal position and the maximally displaced gas pedal position are assigned corresponding to the range between the engine output at the least specific fuel consumption up to the maximum possible engine output at predefined engine speed n.

The method may also be used in diesel engines, where instead of setting throttle valve 3, the injected fuel quantity may be set in a diesel engine with the aid of the manipulated variable.

What is claimed is:

1. A method for consumption-optimized operation of an internal combustion engine of a motor vehicle in a consumption-optimized operating mode, comprising:
    setting an engine output of the internal combustion engine as a function of a position of a gas pedal according to a manipulated variable, the gas pedal being adjustable in a first mechanically defined adjustment range between an initial position and a specific gas pedal position; and
    controlling the internal combustion engine with a consumption-optimized engine output with regard to an instantaneous engine speed by adjusting the gas pedal to the specific gas pedal position, the consumption-optimized engine output causing a minimal fuel consumption at the instantaneous engine speed;
    wherein a second adjustment range of the gas pedal is provided following the specific gas pedal position of the first adjustment range, an increased displacement force being required in contrast to a displacement force needed for a displacement in the first adjustment range when the gas pedal is displaced from the first adjustment range into the second adjustment range, gas pedal positions within the second adjustment range being assigned to respective first additional manipulated variables for setting the engine output according to an assignment function, the respective first additional manipulated variables controlling the internal combustion engine with corresponding engine outputs which are between the consumption-optimized engine output and a maximum possible engine output at the instantaneous engine speed according to the assignment function.

2. The method as recited in claim 1, wherein gas pedal positions within the first adjustment range are assigned to respective second additional manipulated variables according to an additional assignment function, the respective second additional manipulated variables controlling the internal combustion engine with corresponding engine outputs which are between a minimum possible engine output and the consumption-optimized engine output at the instantaneous engine speed.

3. The method as recited in claim 2, wherein the additional assignment function is a continuous assignment function.

4. The method as recited in claim 2, wherein an injected fuel quantity or an opening of a throttle valve is set with the aid of a manipulated variable.

5. The method as recited in claim 1, wherein the gas pedal is adjustable in the second adjustment range from the specific gas pedal position to another specific gas pedal position that corresponds to a stop of the gas pedal in a maximum deflected position.

6. The method as recited in claim 1, wherein in a normal operating mode, which is different from the consumption-optimized operating mode, the internal combustion engine is controlled at the specific gas pedal position with a maximum possible engine output with regard to the instantaneous engine speed.

7. The method as recited in claim 6, wherein the normal operating mode or the consumption-reduced operating mode is selected as a function of a manual input, by a maximum displacement of the gas pedal.

8. A device for controlling an internal combustion engine of a motor vehicle having an engine output predefinable via a manipulated variable, comprising:
    a gas pedal adapted to set an engine output of the internal combustion engine according to the manipulated variable as a function of a position of the gas pedal, the gas pedal being adjustable in a first mechanically defined adjustment range between an initial position and a specific gas pedal position; and a control unit adapted to control the internal combustion engine with a consumption-optimized engine output with regard to an instantaneous engine speed by adjusting the gas pedal to the specific gas pedal position of the first adjustment range, the consumption-optimized engine output causing a minimal fuel consumption at the instantaneous engine speed;

wherein the gas pedal has a second mechanically defined adjustment range which follows the first adjustment range, an increased displacement force being required for displacing the gas pedal from the first adjustment range into the second adjustment range in contrast to the displacement force needed for a displacement in the first adjustment range, the control unit being adapted to assign gas pedal positions within the second adjustment range to respective additional manipulated variables for setting the engine output according to an additional assignment function, the respective additional manipulated variables controlling the internal combustion engine with corresponding engine outputs which are between the consumption-optimized engine output and a maximum possible engine output at the instantaneous engine speed.

9. The device as recited in claim 8, wherein gas pedal positions within the first adjustment range are assigned to respective second additional manipulated variables according to an additional assignment function, the respective second additional manipulated variables controlling the internal combustion engine with corresponding engine outputs which are between a minimum possible engine output and the consumption-optimized engine output at the instantaneous engine speed.

10. The device as recited in claim 9, wherein an injected fuel quantity or an opening of a throttle valve is set with the aid of a manipulated variable.

11. The device as recited in claim 9, wherein the additional assignment function is a continuous assignment function.

12. The device as recited in claim 8, wherein the gas pedal is adjustable in the second adjustment range from the specific gas pedal position to another specific gas pedal position that corresponds to a stop of the gas pedal in a maximum deflected position.

13. The device as recited in claim 8, wherein in a normal operating mode, which is different from the consumption-optimized operating mode, the internal combustion engine is controlled at the specific gas pedal position with a maximum possible engine output with regard to the instantaneous engine speed.

14. The device as recited in claim 13, wherein the normal operating mode or the consumption-reduced operating mode is selected as a function of a manual input, by a maximum displacement of the gas pedal.

* * * * *